United States Patent [19]

Nicholson

[11] Patent Number: 4,601,475
[45] Date of Patent: Jul. 22, 1986

[54] HAT-SHAPED SHAFT SEAL OF MULTIPLE LAYERED MATERIAL

[76] Inventor: Terence P. Nicholson, Calf Hall, Muggleswick, Derwentside, England

[21] Appl. No.: 788,584

[22] Filed: Oct. 17, 1985

[30] Foreign Application Priority Data

Oct. 17, 1984 [GB] United Kingdom ............... 8426216

[51] Int. Cl.⁴ ............................................. F16J 15/12
[52] U.S. Cl. ................. 277/205; 277/212 C; 277/233; 277/235 R
[58] Field of Search ............... 277/205, 212 R, 212 C, 277/227, 234, 233, 235 R

[56] References Cited

U.S. PATENT DOCUMENTS

| 723,096 | 3/1903 | Wert | 277/212 C |
| 1,466,087 | 8/1923 | Christenson | 277/212 C X |
| 1,520,704 | 12/1924 | Farmer | 227/212 C |
| 2,004,652 | 6/1935 | Dempsey | 277/212 R X |
| 3,372,941 | 3/1968 | Liebig | 277/212 R X |

FOREIGN PATENT DOCUMENTS

| 407262 | 9/1944 | Italy | 277/205 |
| 1873 | of 1912 | United Kingdom | 277/212 C |

Primary Examiner—Robert S. Ward
Attorney, Agent, or Firm—Fidelman, Wolffe & Waldron

[57] ABSTRACT

An annular seal primarily for use in preventing leakage of liquids and gases along rotating and/or reciprocating shafts where the latter pass through support structures such as plates and casings. The annular seal (3) is characterized in that it has the shape of a hat with an axially apertured crown (3a) and an adjoining brim (3b) each comprised of a plurality of alternately interleaved layers of sheet metal (M) and of a non-metallic material (G) selected from expanded graphite, carbon, natural or synthetic rubber or bonded fibrous material. Such a seal can also be used in the sealing of a butterfly valve when in its closed position.

8 Claims, 9 Drawing Figures

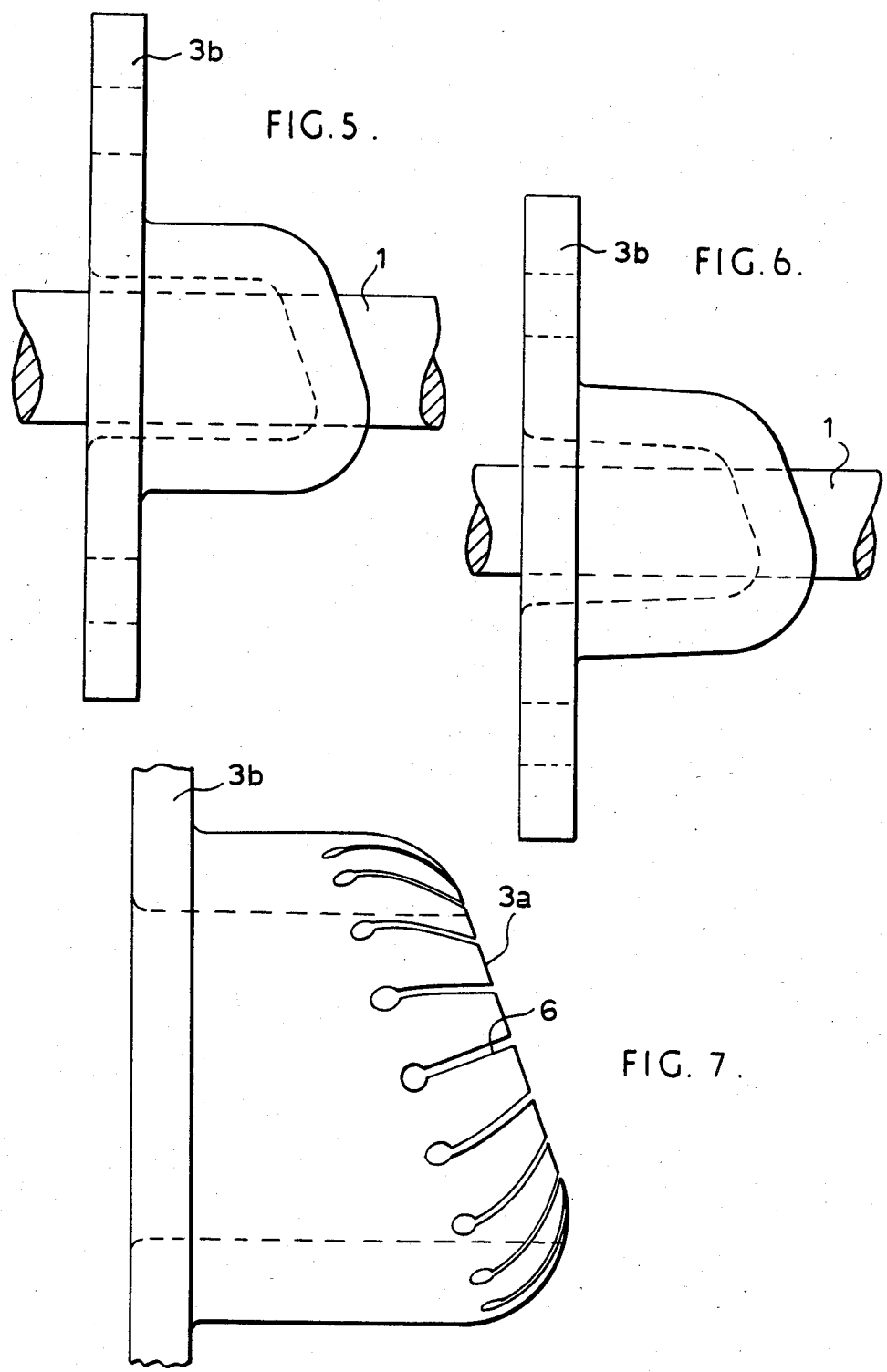

HAT-SHAPED SHAFT SEAL OF MULTIPLE LAYERED MATERIAL

This invention relates to an annular seal for use in preventing leakage of liquids and gases along rotating and/or reciprocating shafts where they pass through support structures, such as plates or casings, and which also finds application in the sealing of butterfly valves when in their closed positions.

The invention has been devised with the object of providing a very efficient seal which can be used in extreme environmental situations, whilst being self-lubricating and possessing a low coefficient of friction. Such situations may involve temperatures ranging from $-200°$ C. to $500°$ C. in oxidising atmospheres and temperatures from $-200°$ C. to the highest metal temperatures in inert atmospheres.

Typical instances of situations where extreme environmental conditions are encountered and with which a seal in accordance with the invention may suitably be used are as follows:
1. Extremely high and low temperature valves for steam and gas turbines and cryogenic applications.
2. Soot blowers for cleaning boiler tubes, superheaters and so forth.
3. Butterfly valves as aforesaid.
4. Actuators in aerospace engineering.
5. Nuclear applications.

In accordance with the present invention therefore an annular seal is characterised in that it has the shape of a hat with an axially apertured crown and an adjoining brim each comprised of a plurality of alternately interleafed layers of sheet metal and of a non-metallic material selected from expanded graphite, carbon, natural or synthetic rubber or bonded fibrous material. Expanded graphite however is to be preferred because of its low coefficient of friction and self-lubricating properties.

The lateral wall part of the crown may be parallel with the centre axis of the seal or may slightly taper towards that axis away from the brim. Also the apertured part of the crown may be perpendicular or inclined relative to the centre axis.

The nature, mode of use and advantages of the invention should however be more clearly apparent from the following description by reference to the accompanying drawings which illustrate various configurations of the improved annular seal. In these drawings.

Figure 1:
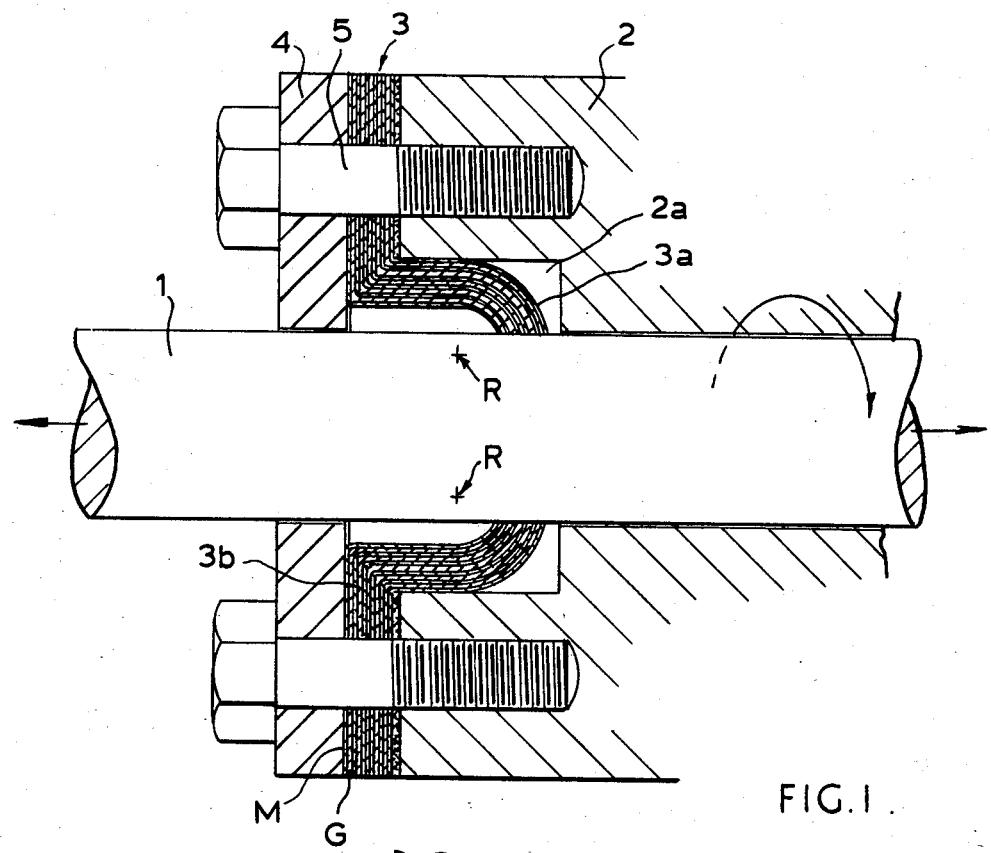
FIG. 1 is an axial section of a typical shaft and annular seal combination in accordance with the invention.
Figure 3:
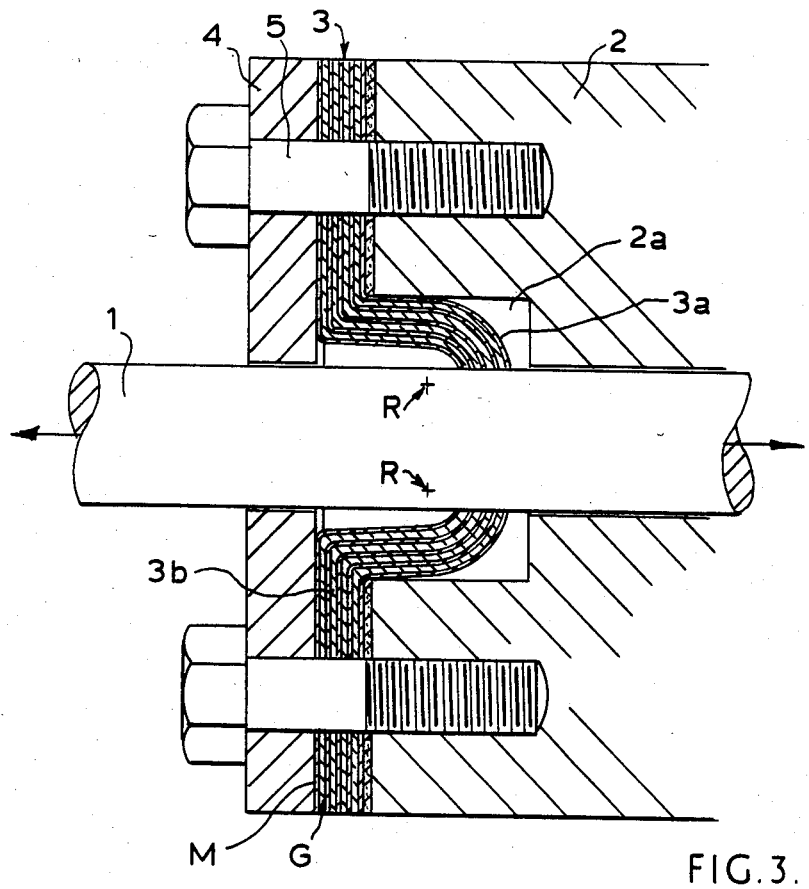
Figure 4:
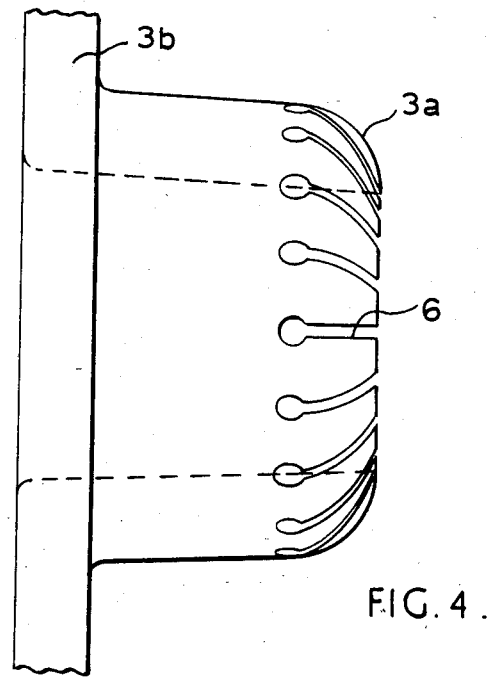
Figure 8:
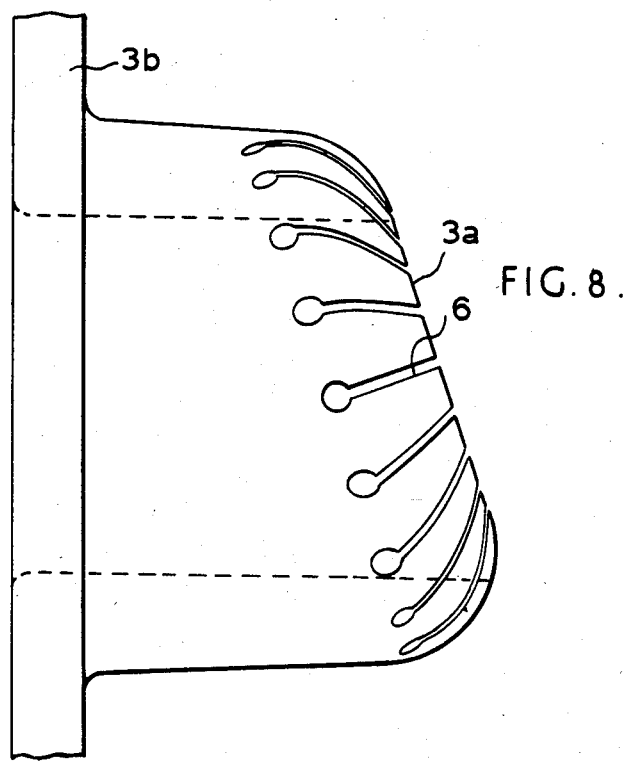
Figure 9:
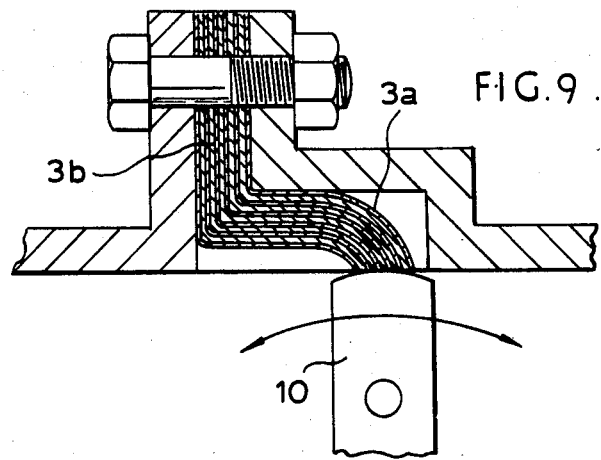

FIG. 3, similar to FIG. 1, shows a slightly moidified shaft and annular seal combination;

FIG. 4 is a side elevation of the annular seal shown in FIG. 3;

FIG. 5 illustrates an unsymmetrical version of the annular seal and shaft combination shown in FIG. 1;

FIG. 6 illustrates an unsymmetrical version of the shaft and annular seal combination shown in FIG. 3;

FIGS. 7 and 8 are elevations of the annular seals respectively illustrated in FIGS. 5 and 6; and FIG. 9 is a fragmentary axial section of a butterfly valve installation which includes an annular seal in accordance with the invention.

The installation in FIG. 1 comprises a rotary and/or reciprocating shaft 1, a body 2 through which the shaft 1 extends, and a centrally apertured clamping plate 4, through which there extend securing studs 5. A hat-shaped annular seal 3, through which the shaft 1 passes, comprises a rounded crown 3a located in a cavity 2a in the body and an integral brim 3b which is sandwiched between the body 2 and the clamping plate 4. This annular seal is built up of layers M of any suitable metal and intervening thicker layers G made of expanded graphite such as that marketed under the trade name "Graphoil", the axial extent of the crown 3a being primarily dictated by the number of metal layers, which is proportional to the pressure to be sealed.

Figure 2:
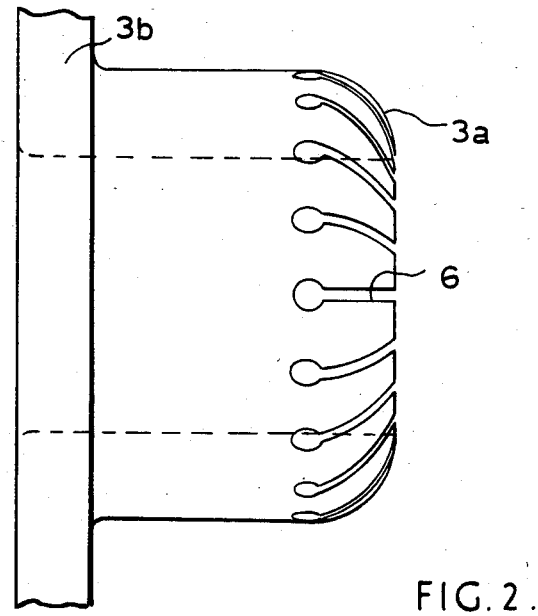
FIG. 2 is a side elevation of the annular seal shown in FIG. 1.

In the manufacture of the seal the metal and graphoil layers are separately pressed into shape At this stage, as indicated in FIG. 2, a series of radial slots 6 are cut into each metal pressing, these slots being of keyhole shape, this being most desirable since it removes possible stress raisers at the end of the slots. However in practice slots of non-keyhole profile may have to be accepted for economic reasons.

After machining and de-burring of the slots the central aperture is then preferably punched out rather than machined to a diameter between 0.1 and 0.15 mm less than the diameter of the shaft 1 which is to be sealed. It is due to the slots and their spring effect that the annular seal is permitted to expand over the slightly larger diameter of the shaft so as to ensure a perfect sealing contact regardless of expansion and contraction during temperature variations.

The metal and expanded graphite layers are then assembled together, in which operation it is absolutely essential that the slots in adjacent metal layers M should be circumferentially staggered relative to one another. To this end some form of positive location of the metal layers should be used during manufacture.

It is further to be noted from FIGS. 1 and 2 that the centres of radius R of the rounded end part of the crown 3a are inside the diameter of the shaft 1. This is to ensure that should there be a sudden excessively high pressure build-up the metal layers M would be forcibly pressed against the shaft 1, whereas if the centre of radius was on the shaft surface, or even radially outside it, the top of the crown could be forced radially outwards with disastrous results, as has happened with presently known seals.

It is to be noted from FIG. 1 that the lateral part of the crown 3a from its curved junction with the brim 3b is parallel with the shaft 1 and defines therewith an annular cavity of uniform radial width.

By contrast in the otherwise identical embodiment illustrated in FIGS. 3 and 4 the same part of the crown is convergent, by an angle of approximately 2½ degrees with respect to its centre or shaft axis so that the aforesaid annular cavity is of reducing radial width away from the brim 3b. At first sight this would appear to be of little consequence but in practice it has two major advantages. Firstly it greatly reduces the possibility of scuffing of the graphoil layers when fitting the layers together into a single unit, and secondly it ensures pressurised interference between the graphoil and the metal pressing when the brim of the annular seal is being clamped.

It has been found that annular seals constructed as above described are not wholly suitable for the sealing of shafts which rotate without undergoing any reciprocal movement. This is because there is a tendency for the radially inward edges of the metal layers M to tear away the surface of the shaft 1 with the result that there is eventual failure of the seal.

In such instances, annular seals as illustrated in FIGS. 5 to 8 inclusive are used, these seals being characterised in that the outward extremity of the crown 3a is in an inclined or non-perpendicular plane relative to the seal or shaft axis.

To prevent damage to the annular seal when it is being fitted, it is most helpful that the end of the shaft 1 should be tapered. Alternatively a tapered hollow wedge could be used to expand the inside diameter of the annular seal to permit entrance of the shaft, the wedge being removed after the seal has been clamped in place. It is to be noted that in the embodiments shown in FIG. 5, the main part of the crown of the seal is parallel with the shaft, as with the embodiments shown in FIG. 1, whereas in FIG. 6 the aforesaid main part of the crown is convergent upon the shaft, as with the embodiments shown in FIG. 3.

In FIG. 9 there is shown an alternative mode of use for the annular seal in the sealing of a butterfly valve 10 when it is in a closed position to prevent flow of liquid or gas along a pipe.

The success of this improved form of seal results from the fact that the metal layers act as strong flexible carriers for the expanded graphite layers and also act as a roughing seal. On the other hand the expanding graphite layers complete the task of obtaining a perfect seal, lubricate the metal pressings where they are in contact with the shaft and guarantee the sealing between the metal layers and the body through which the shaft passes.

I claim:

1. An annular seal characterised in that it is of substantially hat shape with an axially apertured crown and an adjoining brim each comprised of a plurality of alternately interleaved layers of sheet metal and of a non-metallic material selected from expanded graphite, carbon, natural or synthetic rubber or bonded fibrous material.

2. An annular seal as claimed in claim 1 wherein the lateral wall part of the crown is parallel with the centre axis of the annular seal.

3. An annular seal as claimed in claim 1 wherein the lateral wall part of the crown tapers slightly towards the centre axis of the annular seal.

4. An annular seal as claimed in claim 3 wherein the taper angle is 2½°.

5. An annular seal as claimed in any of claims 1 to 4 wherein the apertured part of the crown is perpendicular to the seal axis.

6. An annular seal as claimed in any of claims 1 to 4 wherein the apertured part of the crown is inclined relative to the seal axis.

7. An annular seal as claimed in any of claims 1 to 4 wherein layers of expanded graphite are of greater thickness than the metallic layers.

8. An annular seal as claimed in any of claims 1 to 4 wherein the metallic layers have a plurality of radial keyhole slots which open into the aperture of the crown and the slots in the layer are circumferentially staggered relative to those of the adjacent layers.

* * * * *